United States Patent
Nuss et al.

(10) Patent No.: US 10,457,177 B2
(45) Date of Patent: Oct. 29, 2019

(54) ARMREST

(71) Applicant: GRAMMER AG, Amberg (DE)

(72) Inventors: Ralph Nuss, Poppenricht (DE); Gerhard Delling, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/481,688

(22) Filed: Apr. 7, 2017

(65) Prior Publication Data
US 2017/0291514 A1    Oct. 12, 2017

(51) Int. Cl.
*B60N 2/75*    (2018.01)
*A47C 7/54*    (2006.01)

(52) U.S. Cl.
CPC ............... *B60N 2/767* (2018.02); *A47C 7/54* (2013.01); *A47C 7/543* (2013.01); *B60N 2/753* (2018.02)

(58) Field of Classification Search
CPC ............ B60N 2/767; A47C 7/54; A47C 7/543
See application file for complete search history.

(56) References Cited

U.S. PATENT DOCUMENTS

| | | | | |
|---|---|---|---|---|
| 4,655,501 A * | 4/1987 | Ishigami | ................ | B60N 2/767 297/113 |
| 4,969,686 A | 11/1990 | Germain | | |
| 5,106,160 A * | 4/1992 | Nomura | .................... | A47C 1/03 297/411.32 |
| 5,702,157 A * | 12/1997 | Hurite | .................... | B60N 2/767 297/411.38 |
| 6,467,847 B2 * | 10/2002 | Bidare | .................... | B60N 2/767 297/411.32 |
| 7,108,328 B2 * | 9/2006 | Himmelhuber | ........ | B60N 2/767 297/411.38 |
| 9,272,644 B2 * | 3/2016 | Faccin | .................... | B60N 2/767 |
| 9,481,275 B2 | 11/2016 | Bohlke | | |
| 2001/0020799 A1 * | 9/2001 | Bullesbach | ............ | B60N 2/767 297/411.38 |
| 2010/0308636 A1 * | 12/2010 | Cebula | .................... | B60N 2/767 297/411.38 |
| 2012/0133189 A1 * | 5/2012 | Kobayashi | ............. | B60N 2/767 297/411.38 |
| 2013/0113263 A1 * | 5/2013 | Yamada | ................... | B60N 2/02 297/423.19 |
| 2015/0091318 A1 * | 4/2015 | Bohner | ................... | B60N 2/767 296/1.09 |
| 2016/0347215 A1 * | 12/2016 | Brockman | ........... | B60N 2/4445 |
| 2016/0348713 A1 * | 12/2016 | Haug | ...................... | A47C 1/026 |
| 2017/0334324 A1 * | 11/2017 | Keller | .................... | B60N 2/427 |

FOREIGN PATENT DOCUMENTS

| | | |
|---|---|---|
| DE | 20004157 U | 12/2000 |
| DE | 102008030160 A | 9/2009 |
| DE | 102014101996 B | 8/2015 |

* cited by examiner

*Primary Examiner* — Timothy J Brindley
(74) *Attorney, Agent, or Firm* — Andrew Wilford

(57) ABSTRACT

An armrest has a base, an arm support pivotal on the base about a pivot axis in opposite pivot directions between a first position and a second position, and a latch for locking the arm support pivotally relative to the base in at least one pivot position. The latch has a movable first formation and an immovable second formation that can be releasably engaged with the first formation. The first formation is movable between a locked position and a released position and is urged by a spring or the like into the locked position. The armrest is mounted on a seat, for example, and in particular a vehicle seat.

11 Claims, 6 Drawing Sheets

ARMREST

FIELD OF THE INVENTION

The present invention relates to an armrest. More particularly this invention concerns an armrest for a motor vehicle.

BACKGROUND OF THE INVENTION

U.S. Pat. No. 7,108,328 describes an armrest comprising an arm support rotatably mounted for pivoting about an axis and that can be locked in various positions by a latch movable between a locked position and a released position. A lockable ratchet mechanism is provided for this purpose, so that the arm support can be moved upward in the locked position, but a downward movement is blocked. The latch moves out of the locked position into the released position only when the arm support has been pivoted upward beyond a certain upper position, whereupon the arm support can be pivoted downwardly. As soon as the arm support is pivoted beyond a certain lower position, the latch moves back into the locked position.

The latch has two annular parts with interengaging toothed faces, namely a first part connected to the armrest in terms of movement and a second part nonrotatable about the axis. The second part is mounted on the axis so as to be displaceable axially and, in the locked position is engaged with the teeth of the first part and in the released position is out of mesh with the teeth of the first part. A spring force applies a load to the second part so as to mesh its teeth with those of the first part.

The pivot axis, the first part and the second part are formed of metal to be able to absorb high retaining forces despite having a low space requirement, so that the latch does not significantly impair the design of the armrest.

OBJECTS OF THE INVENTION

It is therefore an object of the present invention to provide an improved armrest.

Another object is the provision of such an improved armrest that overcomes the above-given disadvantages, in particular that enables a more lightweight construction and a flexible design, despite high retaining forces.

Another object of the invention is to create an armrest that has a narrow design in the direction parallel to the pivot axis.

SUMMARY OF THE INVENTION

An armrest has according to the invention a base, an arm support pivotal on the base about a pivot axis in opposite pivot directions between a first position and a second position, and a latch for locking the arm support pivotally relative to the base in at least one pivot position. The latch has a movable first formation and an immovable second formation that can be releasably engaged with the first formation. The first formation is movable between a locked position and a released position and is urged by a spring or the like into the locked position. The armrest is mounted on a seat, for example, and in particular a vehicle seat.

The first formation is provided with a guide, for example, by which the first formation is movably guided between the locked position and the released position. For example, the first formation is guided by an axial guide that works parallel to the pivot axis of the arm support.

The first formation is assigned to the arm support, for example. In this case, the first formation is assigned, for example, to a separate part rotation fixed on the armrest. The part is movably mounted in a direction parallel to the rotation axis, for example. The second formation is on the base.

According to an alternative embodiment, the first formation is on the base and, for example, is rotationally fixed to the nonrotating base. For example, the first formation can be displaced parallel to the pivot axis. In this case as well, the first formation is on, for example, to a separate part that can be moved relative to the base.

The second formation is integrally formed on the base or on the arm support so as to be immovable, for example. In this embodiment, the second formation is designed in one piece with the base or the arm support as a molded part, for example. As an alternative, the second formation can be assigned to a separate part fixed immovably fixed to the base or the arm support.

In other words, the first formation is movable on the arm support, for example, and the second formation is fixed on the base. As an alternative, for example, the first formation is movable on the base, and the second formation is fixed to the arm support.

According to one embodiment, the first formation and the second formation are designed coaxially to the pivot axis of the armrest. The first formation and the second formation are annular, for example that is designed coaxially to the pivot axis. For example, the first formation and the second formation form parts with toothed faces pointing toward each other. The arrays of teeth on their faces are annular and centered on the axis.

The first formation is part of an annular catch, for example that can be moved axially, but rotationally connected to the arm support or to the base.

The pivot axis is formed, for example, by at least one stem that projects from the base and, at one side, is held on the base and on which the arm support is at least partially pivotably mounted. Stem within the meaning of the invention is understood to mean a projection extending from the base and provided with at least one bearing surface on which the arm support can be mounted so as to at least partially pivot about the pivot axis. "At least partially pivotably mounted" within the meaning of the invention shall be understood to mean that the arm support can be partially mounted on a first stem and partially on at least one second stem.

The stem is formed in one piece with the base, for example. According to an alternative embodiment, the pivot axis can also be formed by a stem that projects from the arm support and, at one side, is held on the arm support and that is pivotably disposed in a corresponding seat of the base body.

The stem supports the arm support and/or supports parts of the latch. For example, the stem can be formed by one or more cylinders and/or by one or more tubular cylinders. The seat can be formed by a sliding surface, for example, and in particular by a cylindrical sliding surface of the stem.

In particular, the arm support forms a slide bearing together with the stem. So as to achieve particular friction properties, at least one slide bushing can be provided between the arm support and the base.

According to one embodiment, the base has two bearing surfaces on which counter-surfaces of the arm support are directly or indirectly braced, and the bearing surfaces of the base and/or of the arm support are axially spaced from one another, for example. Axially spaced is understood to mean that the surfaces are spaced apart from one another in a direction parallel to the pivot axis.

According to one embodiment of the invention, a first bearing surface is formed on a first stem and a second bearing surface is formed on a second stem coaxial to the first stem. The first bearing surface is formed, for example, by a cylindrical surface coaxial to the pivot axis. For example, the first bearing surface is formed on a cylindrical projection. The second stem can be a tubular cylinder, for example, on which the second bearing surface is formed. The first stem can be disposed inside a second stem having a tubular-cylindrical design, for example.

According to one embodiment, one bearing surface is disposed radially inside, and one bearing surface is disposed radially outside the first formation and the second formation, relative to the pivot axis. This embodiment requires the first formation and the second formation to be formed on a circular path or pitch circle path about the pivot axis. This embodiment allows a flat design of the armrest axially.

For example, the arm support has a hole at one end, through which the stem extends. The hole is coaxial to the pivot axis, for example.

According to one embodiment, the first formation can be moved between the locked position and the released position by manual actuation and/or as a function of the position of the arm support. For example, an actuating device is provided, by which the latch can be manually moved by the user into the released position. According to an alternative embodiment, or in addition, the armrest is moved into the released position as a function of the armrest position, as is known from the prior art. Reference is made to U.S. Pat. No. 7,108,328 whose disclosure is incorporated by reference in the present application.

For example, the latch forms a ratchet mechanism, and, in the locked position of the latch, the arm support can be pivoted upward but downward pivoting is prevented. The armrest has the following function, for example. When the arm support is moved into a certain upper pivot position, the latch automatically moves from the locked position into the released position in which the first formation and the second formation are disengaged. In the released position, the arm support can be pivoted downward. In a lower pivot position, the latch moves into the locked position and the form-locked ratchet mechanism is activated again, and only an upward movement of the armrest is possible.

The base and the arm support are in particular plastic molded parts. The first and/or the second formation are also plastic molded parts, for example. The first formation forms a separate plastic part while the second formation is integrally formed on the base or on the arm support.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
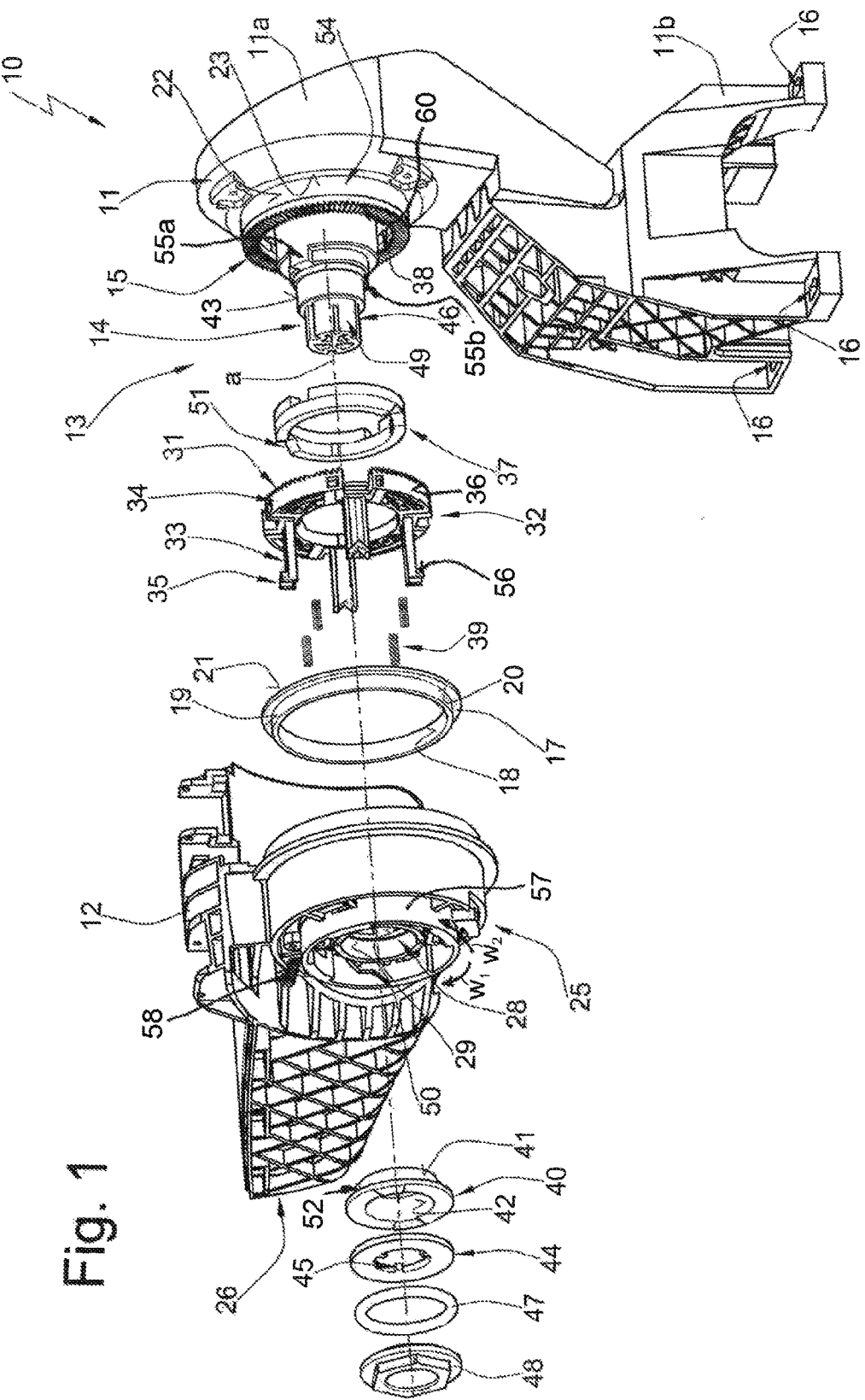
FIG. 1 is an exploded view of the armrest according to the invention.

As seen in an armrest is identified overall at 10. Identical reference numerals in the different figures stand for corresponding parts, even if lower-case letters are added or omitted.

The armrest 10 has a base 11 and an arm support 12. Here, the base 11 has parts 11a and 11b attached to one another to form the base 11. Each of the parts 11a and 11b is molded of a thermoplastic in a injection-molding process. According to an alternative embodiment, the base could also be designed in one piece as a plastic part. The part 11b of the base 11 is a foot and has holes 16 by for bolting of the base 11 to the vehicle frame.

Figure 3:
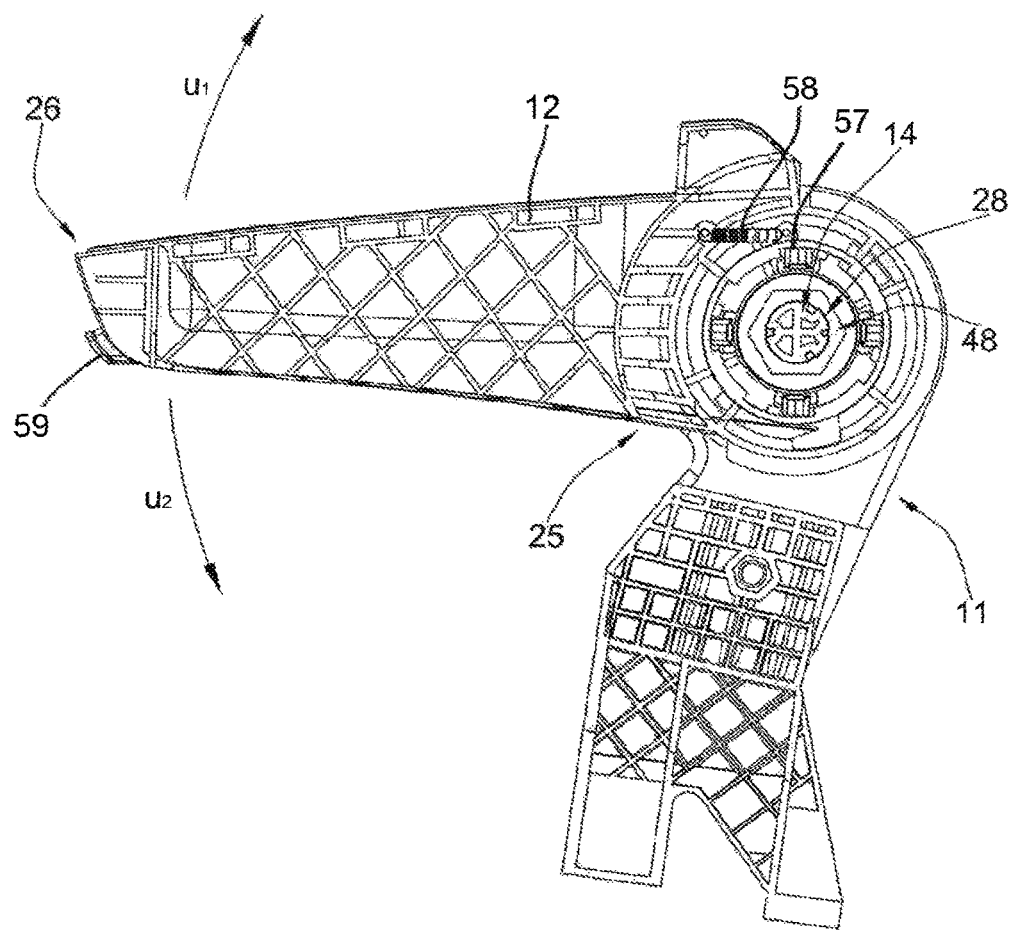
FIG. 3 is a sectional through of the armrest with the arm support is in the first use position (lowermost position)
Figure 4:
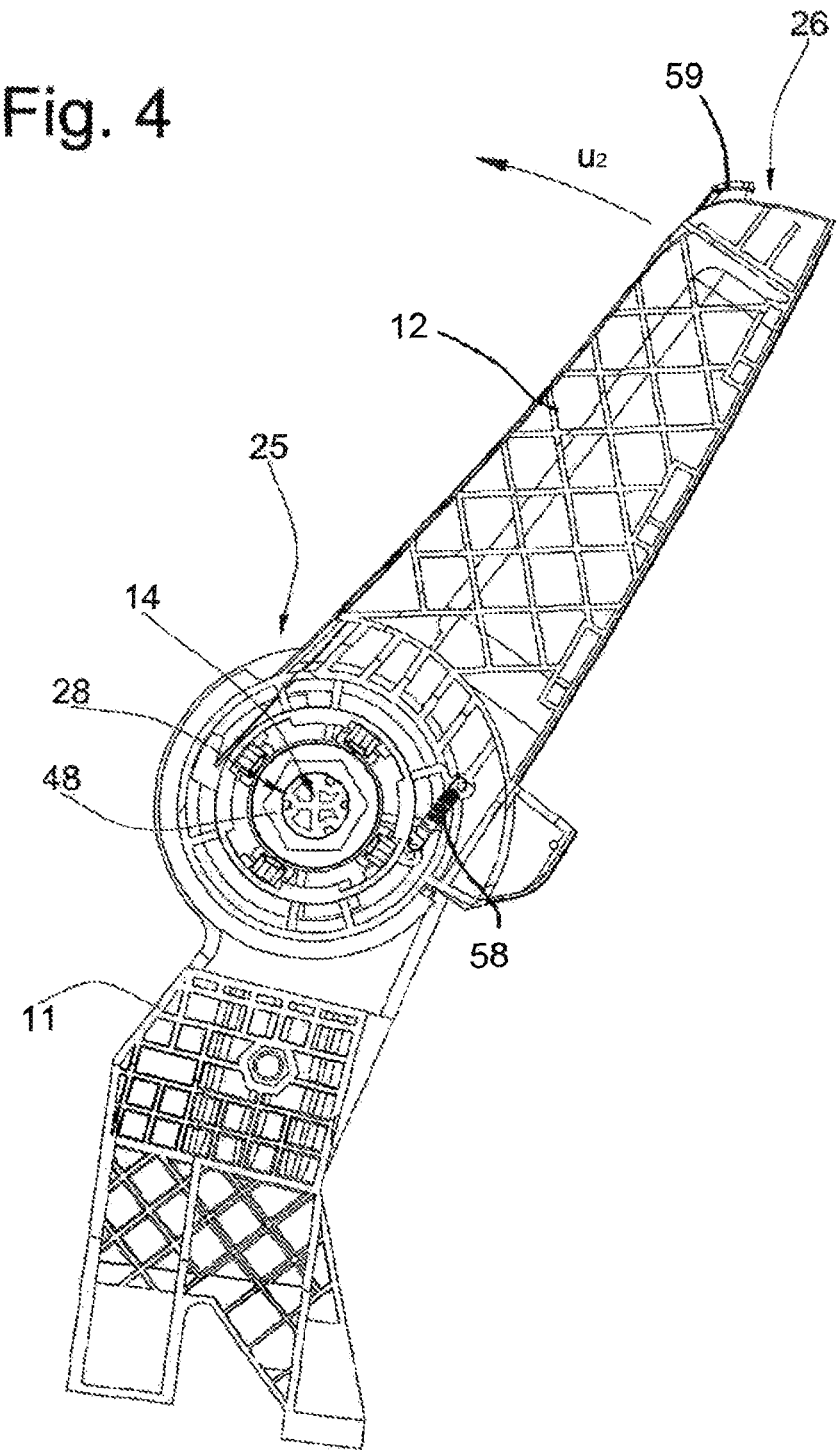
FIG. 4 is the armrest as in FIG. 3 but with the arm support in a nonuse or uppermost position.

The arm support 12 pivots on the base 11 about a pivot axis a between a lower first position (FIG. 3) and an upper second position (FIG. 4). The first position is a use position in which the user is able to brace himself or herself on the arm support 12, and the second position is a nonuse position.

The armrest 10 has a latch 13 that can assume a locked position and a released position. In the locked position, the arm support 12 can be pivoted upward about the pivot axis a in direction $u_1$, but downward pivoting in direction $u_2$ is not possible. In the released position, the arm support 12 can be pivoted freely in both directions $u_1$ and $u_2$.

According to FIG. 1, the base 11 has a first stem 14 having several cylindrical surfaces that are coaxial to the pivot axis a. Here, the stem 14 has a first bearing surface 43 and a threaded region 49. The bearing surface 43 and the threaded region 49 have different diameters. The lowermost end position and the uppermost end position of the arm support 12 are defined by stops 55a and 55b formed on the stem 14 and cooperating with unillustrated counter-stops of the arm support 12.

The base 11 furthermore has an annular formation 15 that is part of the latch 13 and, here, is a part that has an array of axially directed teeth on its face and is fixed immovably on the base 11. The axially projecting teeth of the formation 15 extend radially of the pivot axis a. The toothed formation 15 is here formed in one piece on the part 11a of the base 11.

The formation 15 is coaxial to the pivot axis a and part of a cylindrically tubular second stem 54 that is coaxial to the pivot axis a. The stem 14 is coaxially inside this second stem 54 relative to the pivot axis a. The formation 15 is on an end face 60 of the stem 54. An outer bearing surface 22 of the stem 54 is radially outward from the bearing surface 43 relative to the pivot axis a. The first formation 15 and an annular second formation 31 are axially between the bearing surface 43 and the bearing surface 22.

An annular axially open recess 38 holding a control ring 37 is formed between the stem 54 and the stem 14.

Figure 2:
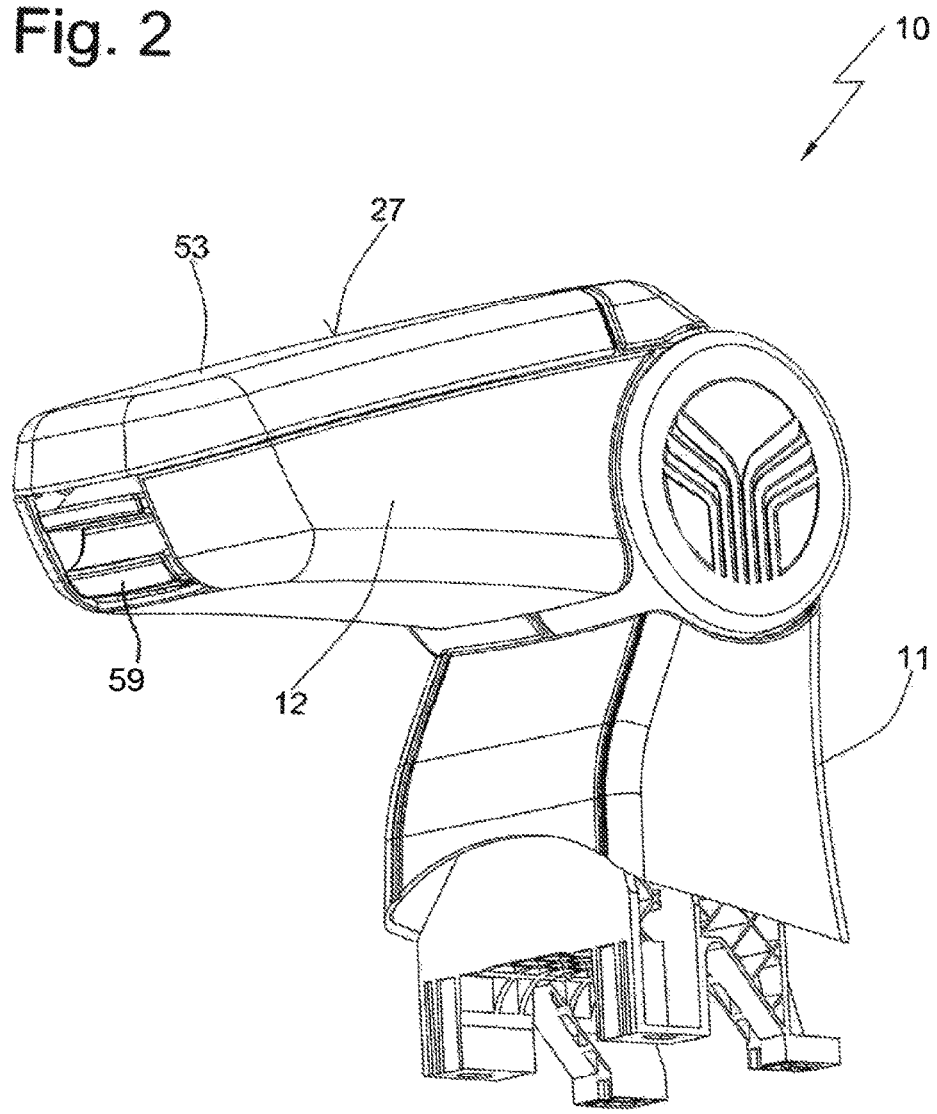
FIG. 2 is a perspective view of the armrest with the arm support in a first use position.

The molded plastic arm support 12 elongated and has an inner end 25 at the axis a and an opposite outer end 26. The outer end 26 is supports a user's arm and is spaced from the pivot axis a. According to FIG. 2, a cover 53 and a side trim panel are attached to the arm support 12. The cover 53 provides a support surface 27 for the arm of the user. In other figures, the trim panel and the cover 53 are not illustrated.

Figure 5:
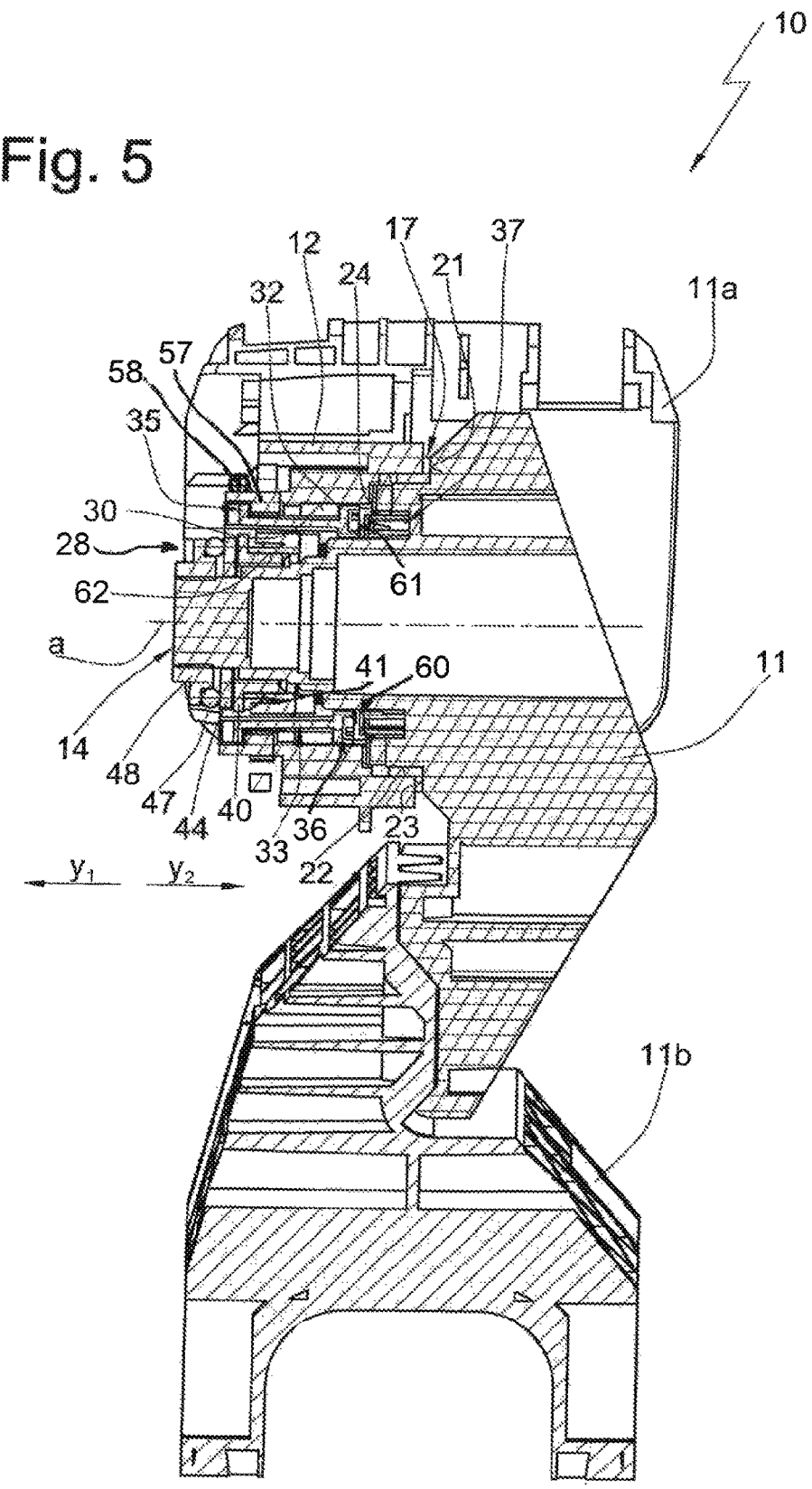
FIG. 5 is a section through the armrest in the locked position.

The inner end 25 of the arm support 12 is a bearing region that allows the arm support 12 to pivot on the base 11 (see FIGS. 1 and 5). The inner end 25 has a hole 28 with inner surfaces 24 and 29 supporting the arm support 12 on the stem 14. In addition, inner surface 30 and 50 are formed inside the hole 28.

A first slide ring 17 is provided to improve the sliding properties and has a radially inwardly directed inner surface 18, a radially outwardly directed outer surface 19, an axially directed end face 20, and a opposite end face 21. The inner surface 18 is seated against a cylindrical outer surface 22 of the stem 54 that is coaxial to the pivot axis a. The outer surface 22 forms an outer surface of the tubular cylindrical stem 54. The end face 21 is in contact with a stop face 23 of the base 11 abutting the outer surface 22. A circular cylindrical inner 24 of the arm support 12 coaxial to the pivot axis a is in contact with the outer face 19.

Furthermore, a slide bushing 40 shown in FIG. 1 is provided with a radially outwardly directed outer surface 41 in contact with the inner surface 29 of the hole 28. The outer surface 41 has several projections 52 extending radially outwardly and axially of the pivot axis a and engaging in respective grooves 62 of the inner surface 29 and in this way form an anti-rotation mechanism. The slide bushing 40 is thus rotatably connected to the arm support 12. An inner surface 42 of the sliding bushing 40 is supported on the cylindrical bearing surface 43 of the stem 14.

A retaining ring 44 has multiple radially inwardly projecting tabs 45 that engage in corresponding grooves 46 of the stem 14 and prevent the retaining ring 44 from rotating on it. A relative movement thus takes place between the retaining ring 44 and the bushing 40 when the arm support 12 is being pivoted.

Figure 6:
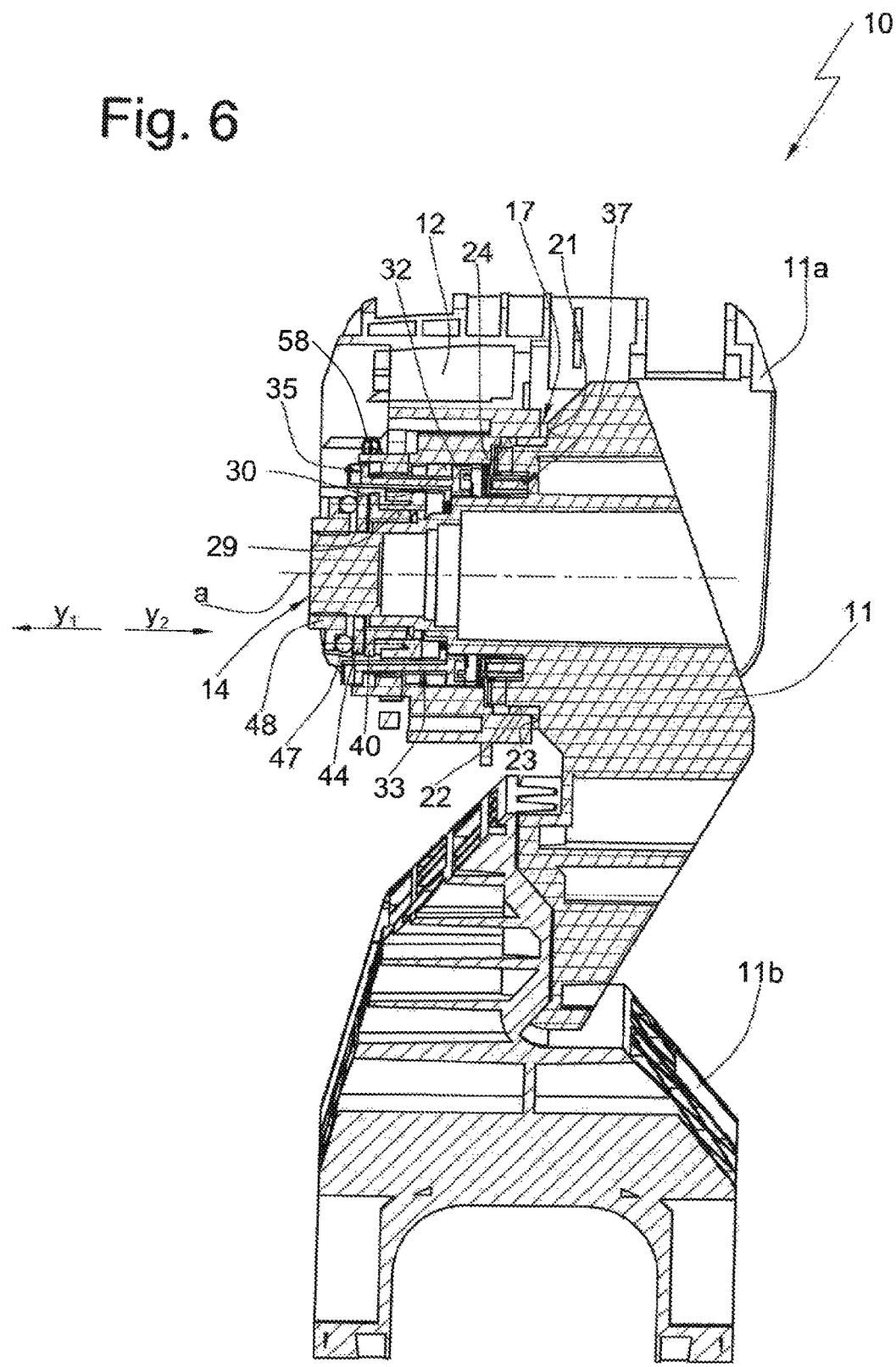
FIG. 6, like FIG. 5, is a section in the released position with the latch having been moved by a control ring.

A lock nut 48 is screwed onto a screwthread 49 of the stem 14. A washer 47 between the lock nut 48 and the retaining ring 44 here is formed by an elastically deformable ring made of plastic or natural material. Alternatively, however, it is also possible to use a disk spring or another spring as the pressure element 47, for example. The pressure element 47 flexibly exerts am axial force in direction $y_2$ (FIG. 6) on the retaining ring 44 so that friction is created between the retaining ring 44 and the sliding bushing 40. The friction causes the arm support 12 to be damped during pivoting.

The second formation 31 is integrally formed on an annular catch 32 that is molded of plastic material and can be displaced between the locked position and the released position. The second formation 31 of the catch 32 has a toothed end face 61 that fits with the toothed first formation 15. Like the first formation 15, the second formation 31 has a circular ring-shaped design and has several teeth extending radially relative to the pivot axis a.

The catch 32 has guide arms 33 that are integrally formed on a tubular cylindrical ring 34 provided with the second formation 31. The guide arms 33 project parallel to the pivot axis a relative to the ring region 34 in direction $y_1$. Each guide arm 33 has a hooked outer end 35 provided with chamfers 56. The chamfers 56 cooperate with complementary unillustrated faces of a disengagement ring 57 such that, during rotation of the disengagement ring 57 in direction $w_1$ against the restoring force of a spring 58 into an actuated position, the catch 32 comprising the formation 31 is moved in direction $y_1$ and disengaged from the formation 15.

Each guide arm 33 is accommodated in a guide recess of the arm support 12 and is movably guided there in axial directions $y_1$ and $y_2$. The inner surface 30 serves as the guide surface for an outer surface 36 of the catch 32. Springs 39 apply an axial load on the catch 32 in direction $y_2$, and a load is applied to the formation 31 so as to engage with the formation 15. When the disengagement ring 57 is thus moved angularly by the spring 58 in angular direction $w_2$ into an unactuated position, the springs 39 displace the catch 32 in direction $y_2$ into the locked position.

The formation 15 and the formation 31 form a lockable ratchet mechanism. When the latch 13 is in the locked position, which is when the formation 15 and the formation 31 are in mesh, upward pivoting of the arm support 12 in direction $u_1$ is possible, while downward pivoting of the arm support 12 is prevented.

The control ring 37 fits in the annular recess 38 of the base 11. The control ring 37 is in contact with the catch 32 and moves it in the known manner between the locked position and the released position as a function of the position of the armrest. With respect to the function of the control ring 37, reference is made to above-cited U.S. Pat. No. 7,108,328 whose content is expressly incorporated by reference in the present application.

Here, the catch 32 can also be manually moved between the locked position and the released position by an actuating device. The actuating device has a handle 59 (see FIGS. 2 and 5) connected to the disengagement ring 57 by an unillustrated linkage, for example a rod assembly. During actuation of the handle 59, the disengagement ring 57 is rotated in a direction $w_1$. When the handle 59 is no longer actuated, the spring 58 displaces the entire actuating device, namely the handle 59, the transmission device and the disengagement ring 57, into the unactuated position.

The arm support 12 is assembled to the base 11 as follows. The control ring 37 is fitted in the recess 38 of the base 11 in such a way that the control cut-outs 51 point toward an unillustrated control formation of the catch 32. The catch 32 and the slide bushings 17 and 40 are installed in the respective seats of the arm support 12. Thereafter, the arm support 12 is installed on the stem 14 in such a way that the stem 14 extends through the hole 28. The inner surface 18 of the sliding bushing 17 is then seated against the outer surface 22 of the base 11. The inner surface 42 of the sliding bushing 40 is in contact with the bearing surface 43 of the stem 14. Afterward, the retaining ring 44 and the pressure ring 47 can be assembled together with the lock nut 48.

The function of the armrest 10 is described hereafter. From the end or use position according to FIG. 3, the arm support 12 in the locked position can be moved in the direction $u_1$ into further use positions. Movement in the direction $u_2$ is not possible since the directional locking mechanism does not allow this. If the arm support 12 is moved beyond a certain upper switch point, such as into the upper end position according to FIG. 4, the control ring 37 displaces the catch 32, disengaging the first formation 31 from the second formation 15. The latch is then in the released position, and the arm support 12 can be moved freely in both of the directions $u_1$ and $u_2$ (see FIG. 6).

According to FIG. 4 the upper end position has been reached, so that the arm support 12 can only be moved in the downward direction $u_2$. As soon as the lower end position has been reached, the control ring 37 switches the latch 13 into the locked position, whereby the catch 32 together with the first formation 15 engaged with the second formation 31, is moved. The arm support 12 can then be moved in the direction $u_1$ again, but not in the direction $u_2$.

We claim:

1. An armrest comprising:
   a base;
   an arm support pivotal on the base about a pivot axis in two opposite pivot directions between a first end position and a second end position;
   a latch for locking the arm support pivotally relative to the base in at least one pivot position, the latch having an angularly and axially movable array of axially extending first teeth rotationally fixed on the arm support or base and an angularly immovable array of axially extending second teeth that can be releasably engaged with the first teeth, the first teeth being movable between a locked position meshing with the second teeth and inhibiting pivoting of the arm support in at least one of the directions and a released position clear of the second teeth and allowing pivoting of the arm support in the one direction and oppositely the other direction;

spring means urging the first teeth into the locked position;

a control element operatively engageable with the first teeth in a predetermined angular position of the arm support for moving the first teeth into the released position; and a manually operable actuating element separate from the control element and including axially extending arms connected to the first teeth for moving the first teeth into the released position.

2. The armrest defined in claim 1, wherein the second teeth are integrally formed on the base or on the arm support.

3. The armrest defined in claim 1, wherein the arrays of the first teeth and of the second teeth are coaxial to the pivot axis of the armrest.

4. The armrest defined in claim 1, further comprising:
a stem projecting from the base, forming the pivot axis, and on which the arm support is pivotable.

5. The armrest defined in claim 4, wherein the arm support has an end formed with a hole through which the stem extends.

6. The armrest defined in claim 4, wherein the arm support and the stem form a slide bearing.

7. The armrest defined in claim 1, wherein the base has separate first and second bearing surfaces on which respective first and second counter-surfaces of the arm support are braced.

8. The armrest defined in claim 7, wherein the base is formed with coaxial first and second stems on which the respective bearing surfaces are formed.

9. The armrest defined in claim 8, wherein one of the bearing surfaces is radially of larger diameter than the other of the bearing surfaces.

10. The armrest defined in claim 1, wherein the manually operable actuating element axially shifts the first teeth into and out of mesh with the second teeth.

11. The armrest defined in claim 1, wherein the arms are axially shiftable in but not angularly movable relative to the arm rest so as to angularly couple the first teeth to the armrest.

* * * * *